M. VAN DER SLUYS.
TREADLE STARTING MECHANISM FOR MACHINES.
APPLICATION FILED APR. 4, 1916.

1,203,658.

Patented Nov. 7, 1916.

2 SHEETS—SHEET 1.

Witnesses

Inventor
M. Van der Sluys

Attorney

M. VAN DER SLUYS.
TREADLE STARTING MECHANISM FOR MACHINES.
APPLICATION FILED APR. 4, 1916.
1,203,658.
Patented Nov. 7, 1916.
2 SHEETS—SHEET 2.
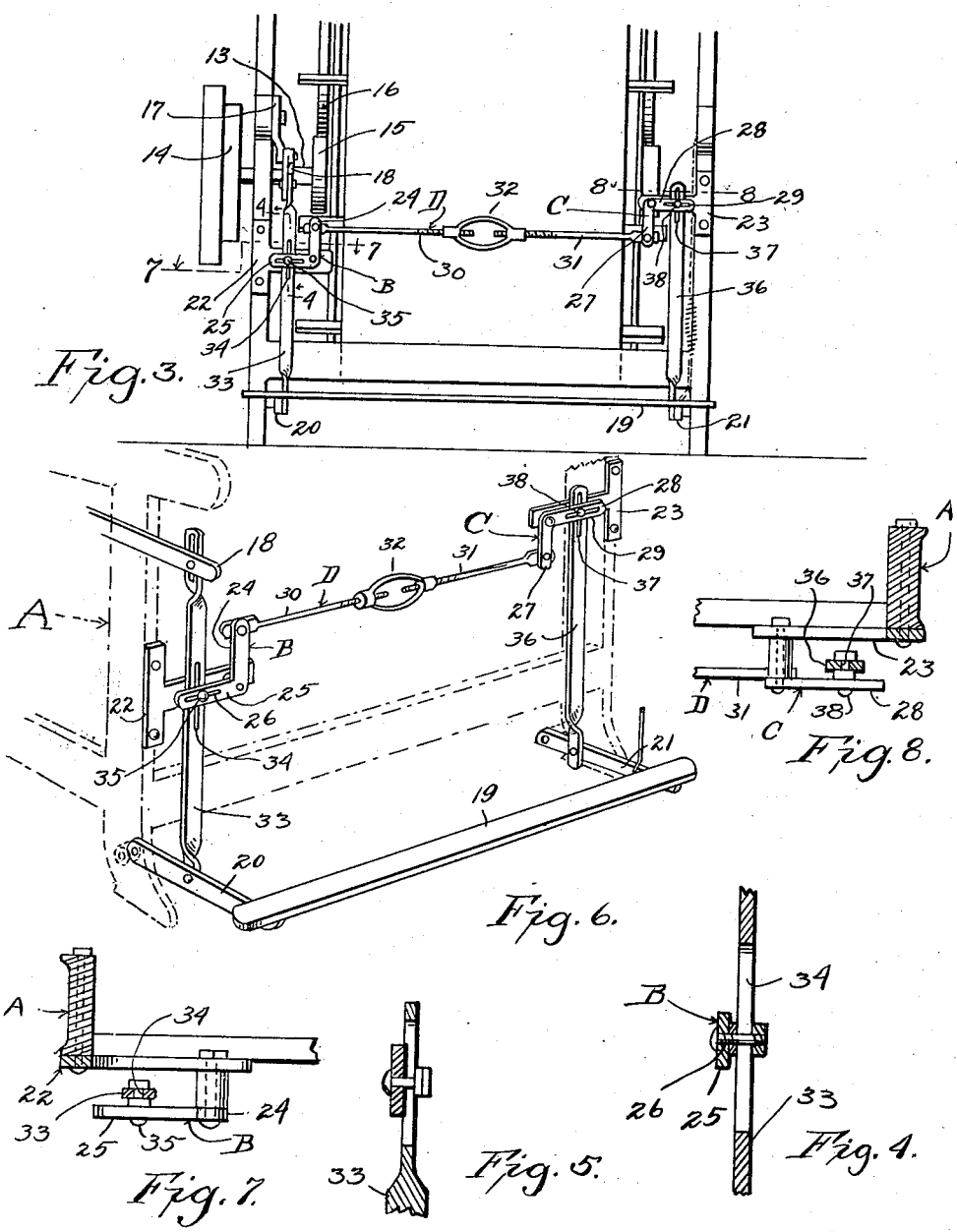
Witnesses
Inventor
M. Van der Sluys
By 
Attorney

UNITED STATES PATENT OFFICE.

MATTHEW VAN DER SLUYS, OF PATERSON, NEW JERSEY.

TREADLE STARTING MECHANISM FOR MACHINES.

1,203,658.   Specification of Letters Patent.   Patented Nov. 7, 1916.

Application filed April 4, 1916. Serial No. 88,964.

*To all whom it may concern:*

Be it known that I, MATTHEW VAN DER SLUYS, a citizen of the United States, residing at Paterson, in the county of Passaic, State of New Jersey, have invented certain new and useful Improvements in Treadle Starting Mechanism for Machines; and I do hereby declare the following to be a full, clear, and exact description of the invention, such as will enable others skilled in the art to which it appertains to make and use the same.

This invention relates to warping and beaming machines and particularly to improved mechanism for throwing the reel of the machine into and out of operation. In this class of machines the rotation of the reel is effected by throwing a friction wheel into engagement with the friction rim of the reel and the movement of the friction reel is controlled by a treadle. This treadle extends entirely across the machine and when the operator stands on the end of the treadle remote from the friction wheel the rotation of the reel is irregular and causes many threads to break with obvious resulting trouble.

It is therefore the purpose of my invention to provide a mechanism in conjunction with the treadle and friction wheel which will obviate irregular rotation of the reel when the operator stands on the end of the treadle remote from the friction wheel.

Figure 1:
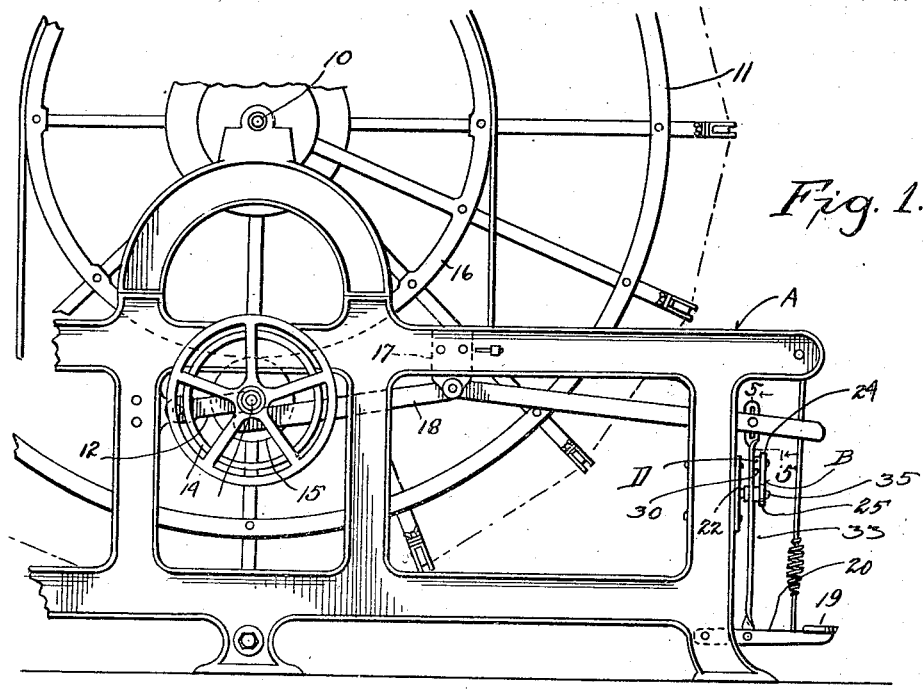
Figure 2:
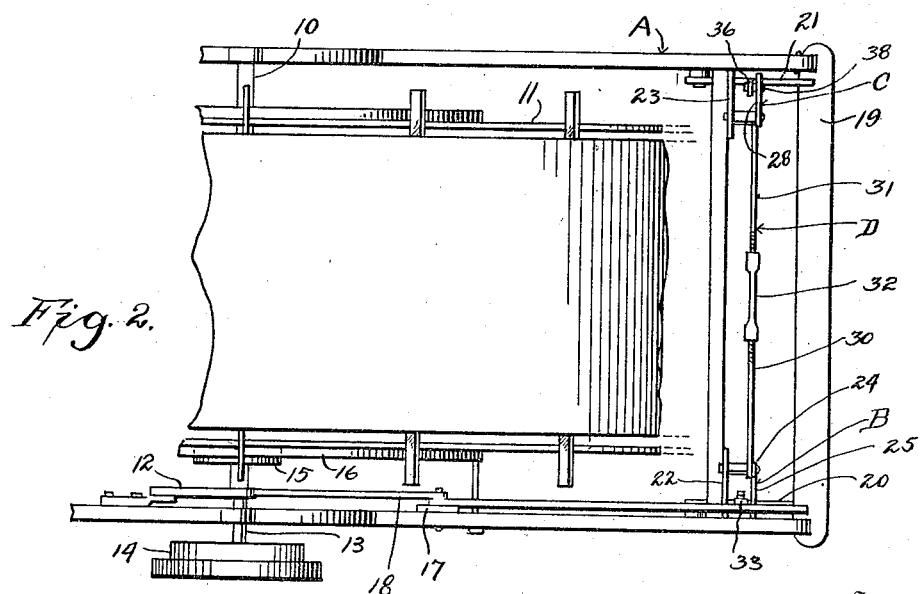

In the drawings chosen to illustrate my invention, the scope whereof is pointed out in the claims—Figure 1 is a side elevation of a fragment of a warping and beaming machine having my invention associated therewith; Fig. 2, a plan view of what is shown in Fig. 1 with a large portion of the reel broken away; Fig. 3, a front view of what is shown in Fig. 1; Fig. 4, an enlarged section on the line 4—4 of Fig. 3; Fig. 5, a section on the line 5—5 of Fig. 1, Fig. 6, a perspective view of the treadle and associated parts; Fig. 7, a section on the line 7—7 of Fig. 3, and Fig. 8, a section on the line 8—8 of Fig. 3.

Referring to the drawings A indicates the frame of the machine, 10 the reel shaft, 11 the reel, 12 the arm pivoted on the frame and which supports at its free end the drive shaft 13, 14 the drive pulley fixed on the shaft 13, 15 the friction wheel fixed on the shaft 13 and 16 the friction rim carried by the reel 11 and adapted to be engaged by the wheel 15 to effect rotation of the reel. Mounted on the frame A is a bracket 17 on which is pivoted a lever 18. One end of this lever extends beneath the free end of the arm 12 while the other end extends to the forward portion of the machine. It will be obvious that by moving the forward end of the lever 18 downwardly the free end of the arm 12 will be lifted and the friction wheel 15 forced into engagement with the rim 16 to effect rotation of the wheel 11.

The mechanism for controlling the friction wheel 15 comprises a treadle 19 pivoted to the forward portion of the frame A and extending entirely across the latter. This treadle 19 embodies arms 20 and 21 which are directly pivoted to respective side portions of the machine. Mounted on the side members of the frame A at the forward ends thereof are bracket plates 22 and 23. Pivoted on the plate 22 is an angle lever B including arms 24 and 25, the latter being provided adjacent its free end with a longitudinal slot 26. Pivoted on the bracket plate 23 is an angle lever C arranged oppositely to the lever B and including arms 27 and 28, the latter being provided with a longitudinal slot 29. The free ends of the arms 24 and 27 of the angle levers B and C are connected by a rod D including sections 30 and 31 united by a turn buckle 32 whereby the rod may be lengthened and shortened as desired. Pivoted to the arm 20 is the lower end of a link 33, said link being provided with a longitudinal slot 34 in which is adjustably mounted a pivot bolt 35. This bolt extends through the slot 26 so that longitudinal movement of the link 33 will effect rocking movement of the lever B. The upper end of the link 33 is adjustably pivoted to the forward end of the lever 18. Pivoted to the arm 21 is a link 36 provided with a longitudinal slot 37 in which is adjustably mounted a pivot bolt 38 engaged through the slot 29 of the lever C.

By this construction it will be obvious that when the treadle 19 is depressed at the end thereof remote from the lever 18 the angle lever C will be rocked and this movement of the angle lever will be transmitted through the rod D to the angle lever B and thence to the link 33 which will result in the forward end of the lever being moved downwardly and the friction wheel 15 properly engaged with the rim 16. It will be apparent that the effect on the lever 18 will be the same whether the treadle 19 is depressed on the side adjacent the lever 18 or on the side remote from said lever.

What is claimed is:—

1. In a beaming machine including a frame supporting driving and driven elements one of which is movable into and out of operative relation with the other, an operating lever for the movable element pivoted on the frame, a treadle pivoted on the frame, and connections between each end of the treadle and the lever whereby the depression of either end of the lever will operate the lever in a direction to move the movable element into operative relation with the other element.

2. In a beaming machine including a frame supporting driving and driven elements one of which is movable into and out of operative relation with the other, an operating lever for the movable element pivoted on the frame, a treadle pivoted on the frame, a link connecting one end of the treadle with said lever, and connections between the other end of the treadle and said link whereby the depression of the end of the treadle remote from the link will positively operate the latter to move the lever in a direction to throw the elements into cooperative position.

3. In a beaming machine including a frame supporting driving and driven elements one of which is movable into and out of operative relation with each other, an operating lever for the movable element, pivoted on the frame, a treadle pivoted on the frame, a link connecting one end of the treadle with said lever, an angle lever pivoted on the frame and operatively connected with said link, a second angle lever pivoted on the frame at the side of the latter remote from the first angle lever, a rod connecting given arms of said angle levers, and a link connecting one arm of the second angle lever with the end of the treadle remote from the first angle lever.

In testimony whereof, I affix my signature, in the presence of two witnesses.

MATTHEW VAN DER SLUYS.

Witnesses:
NICK ROPER,
CHRISS KEYZER.

Copies of this patent may be obtained for five cents each, by addressing the "Commissioner of Patents, Washington, D. C."